Sept. 2, 1924.
A. S. LEWIS
1,507,073
PRESSURE REDUCING VALVE
Filed Nov. 30, 1921
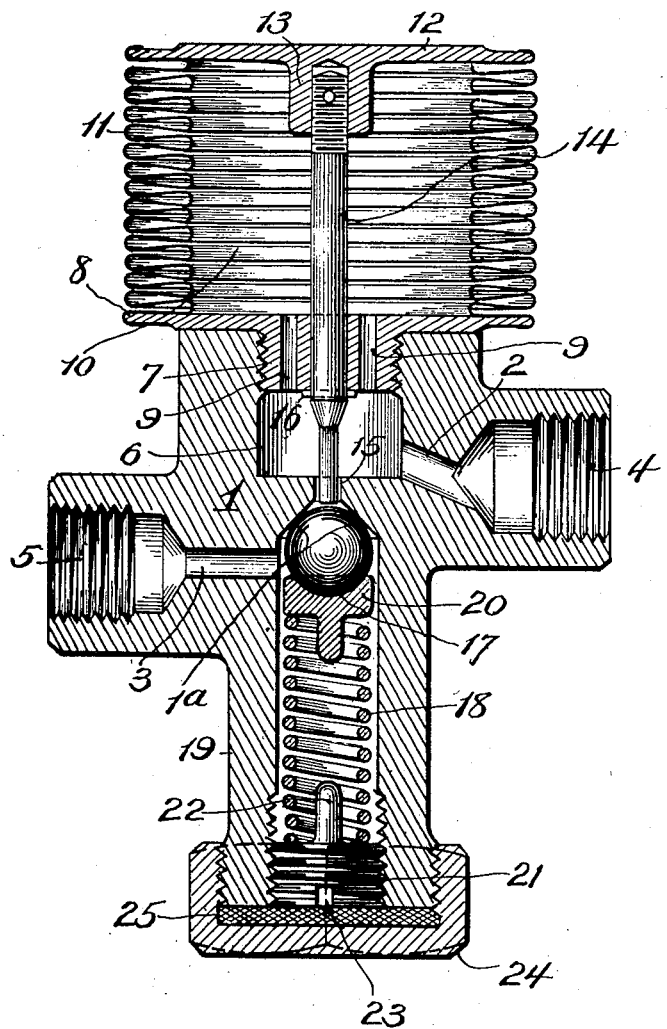

Patented Sept. 2, 1924.

1,507,073

UNITED STATES PATENT OFFICE.

ALFRED S. LEWIS, OF WEST CHESTER, PENNSYLVANIA.

PRESSURE-REDUCING VALVE.

Application filed November 30, 1921. Serial No. 518,849.

*To all whom it may concern:*

Be it known that I, ALFRED S. LEWIS, a citizen of the United States, and a resident of West Chester, in the county of Chester and State of Pennsylvania, have invented certain new and useful Improvements in Pressure-Reducing Valves; and I do hereby declare the following to be a full, clear, and exact description of the invention, such as will enable others skilled in the art to which it appertains to make and use the same.

This invention relates to improvements in pressure reducing valves and more particularly to such as are intended for use in refrigerating systems, for the purpose of automatically controlling the passage of fluid from the variable high pressure side of the system to the low pressure or vacuum side,—one object of the invention being to so construct a valve of the type so specified that it shall be simple, require but little attention and which shall be highly efficient and accurate in operation.

With this and other objects in view, the invention consists in certain novel features of construction and combinations of parts as hereinafter set forth and pointed out in the claims.

The accompanying drawing is a sectional view showing an embodiment of my invention.

The casing 1 of the valve is provided therein with a valve seat 1ª and is formed with lateral ducts 2 and 3, respectively above and below the valve seat,—said ducts terminating in nipples 4 and 5 at respective sides of the casing, to be connected respectively, through suitable piping, with the suction side of the pump of a refrigerating system and with the pressure line of the latter.

The casing 1 is formed with a chamber 6 with which the duct 2 communicates and a portion of the wall of this chamber is threaded to receive the threaded shank 7 of a head or plate 8,—said head and its shank being provided with a plurality of ducts 9 which connect the chamber 6 with a chamber 10 formed by a wall 11 preferably of the bellows type so that it shall be collapsible and the upper end of this chamber 10 is closed by a head 12 secured to and movable with the bellows. The movable head 12 is provided with an enlargement 13 having a socket to receive one end portion of a valve stem or plunger 14 which is rigidly secured in said socket so as to be movable with the head 12. The stem or plunger 14 is freely movable through a central hole in the fixed head 8 and its shank 7. The lower end portion of the stem or plunger 14 passes through the chamber 6 and is sufficiently contracted in size to also pass through a hole 15 extending from said chamber 6 to the valve seat 1ª. A pin 16 passes transversely through the plunger 14 and projects beyond diametrically opposite portions so as to provide stop means for limiting the upward movement of said stem or plunger and of the movable head of the collapsible chamber 10.

A valve 17, (preferably of the ball type) is adapted to rest against the valve seat 1ª and close the hole or port 15,—the lower end of the stem or plunger 14 being normally disposed in close proximity to said valve. The valve 17 is normally pressed against its seat by the action of a spring 18 located within a tubular portion 19 of the casing. A cap 20 to bear against the valve is provided at the upper end of the spring 18 and is made or provided with a shank to enter said spring. The lower end of the tubular portion 19 of the casing is internally threaded to receive a threaded plug 21 against which the lower end of the spring bears. This plug is provided with a shank 22 to enter the lower end portion of the spring and with a slot 23 to receive a tool whereby said plug may be turned to adjust the tension of the spring and hence the pressure with which the valve bears against its seat. The lower end of the tubular portion 19 of the casing is sealed by a cap 24 screwed thereon and provided therein with a suitable packing gasket 25.

When the nipple 5 is connected with the pressure line and the nipple 4 is connected with the suction side of the pump of a refrigerating system, the operation of my improvements may be described as follows:

When the pump is started, the valve 17, being held against its seat by the tension of the spring 18, prevents any flow of fluid past the valve until the predetermined vacuum is created by the suction of the pump. The atmospheric pressure on the outer surface of the movable head 12 during the period in which the vacuum is maintained inside the bellows causes the head and stem or plunger 14 to be depressed and the valve 17 to be opened sufficiently to permit passage of fluid. Should more fluid pass the valve than the pump could remove the vacuum would be lessened and the pressure on each side of the movable head 12 more nearly equalized, thus permitting the spring 18 to close the valve against further flow until the previous vacuum pressure shall be restored by the action of the pump.

By careful adjustment of the spring tension, through the medium of the regulating plug 21, it is possible to secure a uniform vacuum on the suction side coincident with the capacity of the pump and when once set for a predetermined vacuum will continue, indefinitely to control the flow of fluid past the valve without further adjustment.

With the use of the stop pin 16, the bellows will be prevented from expanding beyond its natural limit of movement in the event of back pressure in the suction line while the pump is at rest.

Having fully described my invention what I claim as new and desire to secure by Letters-Patent, is:

1. In a valve of the character specified, the combination of a casing having a valve seat therein and provided with ducts above and below said valve seat, said casing having a chamber above the valve seat and in constant free communication with one of said ducts, said latter duct and chamber being of different capacities, a collapsible chamber communicating with the chamber in the casing above the valve seat, a valve, a spring operable to press said valve against its seat, and a stem or plunger secured to a movable member of the enclosure of said collapsible chamber and operable to move said valve from its seat against the resistance of said spring.

2. In a valve of the character described, the combination with a casing provided therein with a valve seat and having a chamber above the valve seat, said casing having a duct communicating with the chamber above the valve seat and also having a duct communicating with the interior of the casing below the valve seat, and a spring pressed valve to rest against said valve seat, of a collapsible chamber provided with a movable member and communicating with the chamber in the casing above the valve seat, a stem or plunger secured to said movable member and passing through the chamber in the casing and adapted to engage the valve to move it from its seat, and stop means carried by said stem or plunger and cooperable with a part rigid with the casing to limit the movement of said movable member and the stem or plunger in a direction away from the valve.

3. In a valve of the character described. the combination with a casing provided therein with a valve seat and with a chamber above the valve seat, said casing also having a duct communicating with said chamber and a duct communicating with the interior of the casing below said valve seat, and a spring pressed valve to rest against said valve seat, of a bellows forming a collapsible chamber, said bellows having a head provided with a part threaded into the chambered portion of the casing and provided with ducts connecting the chamber in the casing with said collapsible chamber, said bellows also provided with a movable head, a stem or plunger secured to the movable head and passing freely through the fixed head of the bellows, said stem or plunger having a part to engage the valve to move it from its seat, and means carried by the stem or plunger and cooperable with the fixed head of the bellows to limit the movement of said stem or plunger and the movable head of the bellows in one direction.

4. In a valve of the character described, the combination with a casing having a valve seat therein and having a chamber above said valve seat, said casing also having a duct communicating with said chamber and a duct communicating with the interior of the casing below the valve seat, and said casing also having a tubular portion below the valve seat, of a valve to rest against the valve seat, a spring in the tubular portion of the casing to press said valve against its seat, a threaded plug in the lower portion of the tubular part of the casing to receive one end of said spring, a cap sealing the free end of the tubular portion of the casing, a bellows having a head secured to the casing and provided with ducts communicating with the chamber above the valve seat, said bellows having a movable head, and a stem or plunger secured to said movable head and passing freely through the fixed head of the bellows and through the chamber in the casing, said stem or plunger adapted to engage the valve to open it.

In testimony whereof, I have signed this specification in the presence of two subscribing witnesses.

ALFRED S. LEWIS.

Witnesses:
I. N. EARL WYNN,
EDITH H. RUSSELL.